United States Patent [19]

Wallick et al.

[11] Patent Number: 4,830,385
[45] Date of Patent: May 16, 1989

[54] CART

[76] Inventors: Clarence H. Wallick, 6141 W. Orange Ave., #32, Cypress, Calif. 90630; Shahriar Dabirnia, 5600 Orangethorpe, #4116, La Palma, Calif. 90623

[21] Appl. No.: 150,736

[22] Filed: Feb. 1, 1988

[51] Int. Cl.⁴ ............................................. B62B 1/22
[52] U.S. Cl. .................................. 280/35; 280/47.19; 280/47.24; 280/DIG. 4; 248/98; 211/204
[58] Field of Search ..................... 280/47.13 R, 47.17, 280/47.19, 47.2, 47.24, 47.35, 33.99 A, DIG. 3, DIG. 4, 35; 248/98; 211/204

[56] References Cited

U.S. PATENT DOCUMENTS

| | | | |
|---|---|---|---|
| 2,249,123 | 7/1941 | Fleck et al. | 280/DIG. 3 X |
| 2,755,096 | 7/1956 | Fishalow | 280/47.17 |
| 2,890,060 | 6/1959 | Ott et al. | 248/98 |
| 3,561,606 | 2/1971 | Stewart | 280/47.2 X |
| 3,998,476 | 12/1976 | Kazmark, Sr. | 280/47.24 X |

FOREIGN PATENT DOCUMENTS

| | | | |
|---|---|---|---|
| 800080 | 6/1936 | France | 280/47.17 |
| 808055 | 1/1937 | France | 280/47.17 |
| 1094470 | 5/1955 | France | 280/47.24 |
| 237701 | 8/1925 | United Kingdom | 280/47.17 |

*Primary Examiner*—Charles A. Marmor
*Assistant Examiner*—Tamara L. Finlay
*Attorney, Agent, or Firm*—Roger A. Marrs

[57] ABSTRACT

A cart is disclosed herein for supporting and transporting a plurality of handled shopping or grocery bags which includes an elongated base having a pair of spaced apart wheels at one end and a stabilizing bar at its opposite. A vertical stanchion carries a support bar at a location midway between its opposite ends on which a multiplicity of posts or pins are carried about which the handles of shipping or grocery bags are held while suspended from the support bar. An adjustable handle is disposed on the end of the support bar over the wheels for tilting the cart on the wheels to pull or push the cart along a traveling surface.

1 Claim, 1 Drawing Sheet

CART

BACKGROUND OF THE INVENTION

1. Field of the Invention

The present invention relates to movable carriers or carts and, more particularly, to a novel cart having a plurality of pins or posts carried on a support member for releasably holding a multiplicity of shopping bags or grocery bags.

2. Brief Description of the Prior Art

In the past, it has been the conventional practice for a consumer to carry grocery bags or shopping bags from place to place by gripping the bags with the hands grasping the handle portion of the bags or by placing the bags into an open container which is then transported from place to place. In some instances, the container is wheeled and includes a handle so that the container can be pushed ahead of the user.

Problems and difficulties have been encountered when employing such a conventional wheeled container which stems largely from the fact that the cart is not easily dismantled for storage in a vehicle and such a cart is not readily assemblable at the site of use. Furthermore, the cart is bulky and cumbersome to use while storage capacity is greatly limited due to the walled construction of the container.

Therefore, a long-standing need has existed to provide a novel cart which is of a break-down construction so as to be readily dismantled for storage in the trunk of a car and one which may be assembled at the site of use. Storage capacity is expanded by providing a non-restricted area for storage so that the articles to be stored are not necessarily forced or jammed into a confining area such as between side walls. Also, such a novel cart must be suitable for pushing or pulling along a surface and in a balanced position so that ease of transport is assured.

SUMMARY OF THE INVENTION

Accordingly, the above problems and difficulties are obviated by the present invention which provides an elongated base having wheels provided at one end and a stabilizing bar at its opposite end. Midway between the opposite ends of the bar, there is provided an upright stanchion terminating in connection with a support bar disposed in an angular relationship therewith. The upper or exposed surface of the support bar is provided with a plurality of spaced apart posts or pegs suitable for receiving the handle portions of a plurality of grocery or shopping bags. An elongated handle is releasably fastened to one end of the support bar immediately above the wheels so that the handle may be used to pull or push the cart along a surface in a balanced orientation.

Therefore, it is among the primary objects of the present invention to provide a novel cart for transporting a plurality of shopping or grocery bags from place to place which includes a support member having a plurality of posts or pegs for releasably securing the handles of the shopping or grocery bags thereto.

Another object of the present invention is to provide a novel cart for transporting a plurality of shopping or grocery bags from place to place which includes a wheeled base supporting an upright stanchion having a pegged member carried thereon about which the handles of the respective bags are positioned for storage purposes.

Yet another object of the present invention is to provide a novel wheeled cart for transporting grocery and shopping bags which includes a support bar having pins or posts arranged in fixed spaced apart relationship for releasably carrying a plurality of loaded shopping bags or grocery sacks by the respective handles thereof so that the full weight of the load is downwardly suspended from the support bar.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

Figure 1:
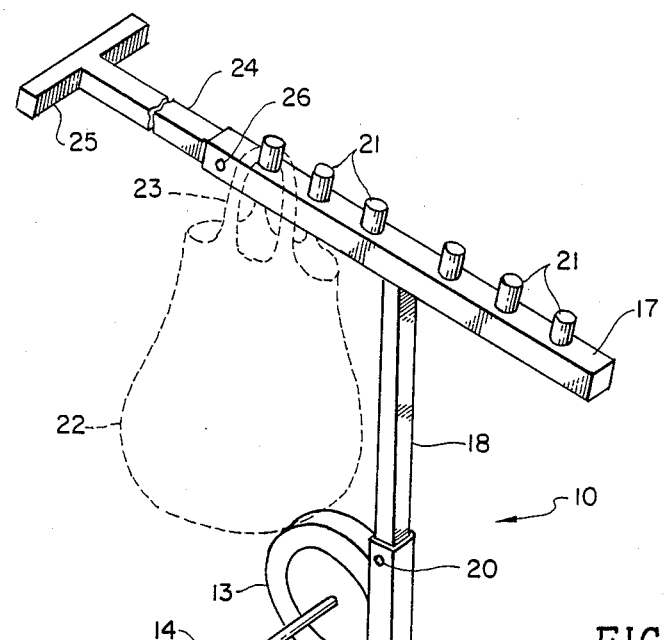
FIG. 1 is a front perspective view of the novel cart incorporating the present invention.

The novel cart of the present invention is indicated in the general direction of arrow 10 as shown in FIG. 1. The cart includes an elongated base member 11 which carries a pair of wheels 12 and 13 at one end by means of a support axle 14. The opposite end of the base member 11 terminates in a stabilizing bar 15 so that the cart is stabilized in a lateral manner when the cart is at rest on a supporting surface. Each of the wheels 12 and 13 are attached to the opposite ends of the axle 14 by standard or conventional means and the midsection of the base member 11 supports an upright stanchion indicated by numeral 16. The upright stanchion 16 is employed for supporting a support bar 17 thereon by means of a connection member 18 or by means of direct attachment to the underside of the bar 17.

For strength purposes, the construction of the member 11, stanchion 16, connection member 18 and bar 17 are composed of square tubes. However, it is to be understood that cylindrical tubes can be employed if desired. The end of connection member 18 immediately adjacent to the stanchion 16 is arranged in telescoping sliding relationship and is held in position by means of a snap or pushbutton member 20 so that the height of the bar above the stanchion can be adjusted.

It is to be particularly noted that the support bar 17 includes a plurality of posts or pins such as post 21 which are arranged across the exposed top of the bar in fixed aligned relationship. The posts are also arranged in spaced apart relationship so that the handle portion of a bag can be placed over the post for releasable attachment therewith, a typical grocery or shopping bag is indicated by numeral 22 and is illustrated in broken lines. The handle portion of the bag is indicated by numeral 23 which is looped over the post or pin 21. The height of each post is sufficient to assure that the handle is captured thereon and that the bag will be downwardly depending in a suspended relationship so that the load will hang below the support bar 17.

A handle member 24 is arranged in telescoping mountable relationship with one end of the support bar 17 so that the handle extends over the wheels 12 and 13. A gripping portion 25 is provided on the end of the handle so that the user may grasp the gripper 25 and pivot the cart on the wheels 12 and 13 so that the stabilizing bar 15 is raised from the supporting surface. At this time, the bar 17 is substantially horizontal with respect to the ground over which the wheeled cart will be transported and the shopping or grocery bags will be suspended from the bar.

Figure 2:
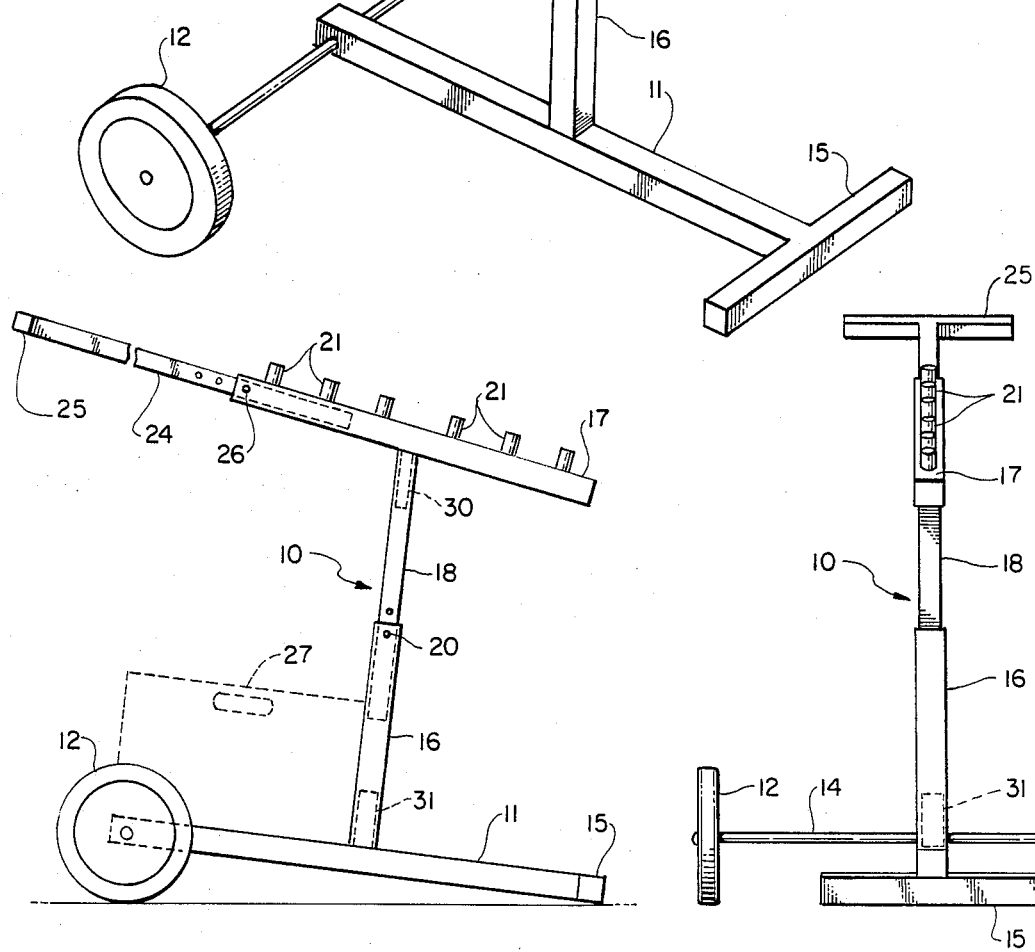
FIG. 2 is a reduced side elevational view of the cart shown in FIG. 1.

As noted more particularly in FIG. 2, the support bar 17 is angularly disposed with respect to the stanchion and connecting member 18 so that the support bar 17 will be in the aforementioned horizontal relationship with respect to the supporting surface during transport of the cart. By this means, the shopping or grocery bags will be suspended immediately below each of the respective posts or pins on which they are hung. Without this horizontal relationship, the bags may strike or impact against one another which may cause damage. The end of the handle 24 telescopically engaged with the end of support rod 17 is held in a releasable fixed position by means of a pin or snap pin connection as indicated by numeral 26.

FIG. 2 further illustrates that a small carton or box may be supported on the axle 14 and one end of the base member 11 forward of the stanchion 16. The box is indicated in dotted lines by numeral 27. The box may have its load integral therewith or the box may be used by the user into which the user can load miscellaneous or accessory items such as umbrellas, coats, hats or the like.

Further reference to FIG. 2 shows that the cart 10 may be readily taken apart for storage purposes such as in the trunk of a car and that the cart may be readily assembled at the site of use. Such portable construction may include the provision of a mounting stud 30 carried on the underside of support bar 17 that may be fitted directly into the open end of the connect member 18 or, if desired, directly into the open end of the stanchion 16. A similar stud as indicated by numeral 31 is carried on the upper surface of the base member 11 that may be insertably received into the opening of stanchion 16 opposite to its end receiving either the connection member 18 or the stud 30. In this manner, portability is achieved since the handle 24 can be disassembled from the end of the support bar 17 by means of the releasable connection 26 while the support stanchion 16 can be removed from the base member 11 by disconnecting its end from the stud 31. By removing the stanchion and/or the connection member 18 from the stud 30, complete disassemblage of the cart is achieved.

Figure 3:
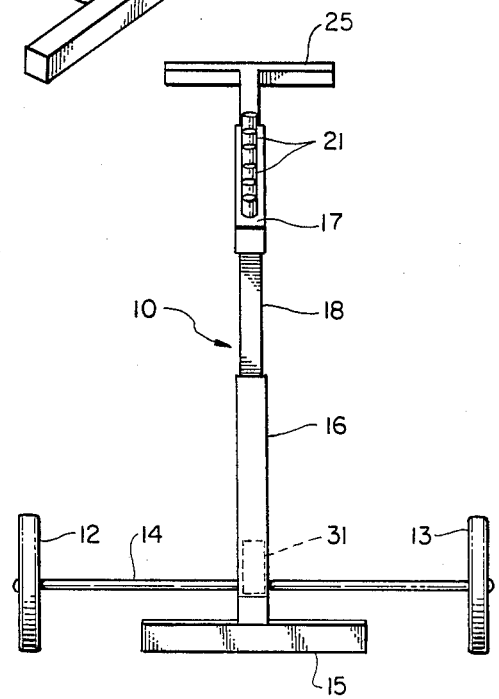
FIG. 3 is an end view of the cart shown in FIGS. 1 and 2.

Referring now in detail to FIG. 3, it can be seen that the plurality of pins or posts 21 are arranged in a linear alignment along the exposed surface of the length of support bar 17. The pins or posts are arranged in fixed space apart relationship and are integral with the bar 17. Lateral stability is achieved for supporting the cart while it is being loaded or unloaded as well as transported by means of the stabilizing bar 15. A tripod arrangement is derived between the wheels 12 and 13 and the stabilizing bar 15 so that the cart will not topple or turn over while the cart is at rest.

Therefore, it can be seen that the novel cart of the present invention provides a means for assembly and disassembly so that the unit is completely portable. The unit may be disassembled for storage purposes in the trunk of a car or to be placed into the closet of a room. When ready for use, the various parts may be assembled together so that the unit is ready for its intended purpose. The posts or pins 21 are exposed so that the opening in the respective handle portions of shopping bags or grocery bags can be placed over the posts or pins whereby the weight or load within each of the respective bags is supported by the support bar 17. The loaded bags are downwardly depending from the bar 17 and are separated from one another in accordance with the separation between the adjacent pins or posts 21.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A portable, take-down cart for transporting a plurality of shopping or grocery bags comprising the combination of:

an elongated, linear base member of square cross-section having wheels at one end and a non-rollable, elongated, transverse stabilizing member carried on the other end of said base member and being normal thereto;

said wheels being carried on opposite ends of an axle carried on said one end of said base member with said wheels laterally disposed of said base member beyond the length of said stabilizing member;

an upright stanchion carried on said base member substantially midway between the opposite ends of said base member and normal thereto;

said stanchion consisting of a pair of telescoping sections in slidable relationship with an adjustment means for selectively securing said sections together to provide a fixed stanchion length;

a hollow support bar carried on the end of said stanchion opposite to and directly above said base member and said support bar disposed in angular relationship thereto and provided with a plurality of upright posts to receive handle portions of the shopping or grocery bags;

a handle member insertably received into one end of said support bar so as to extend beyond said wheels and to tilt said base member whereby said base member totally is supported on said wheels;

stud means carried on said base member and said support bar for cooperative insertion of said stanchion with said base member for take-down purposes wherein said stud means includes a stud on said base member for receiving the end of said stanchion opposite to its end secured to said support bar;

said posts are arranged in linear alignment along the length of said support bar in fixed spaced-apart relationship; and said angular disposition of said support bar with said stanchion cooperating with said stabilizing member to stabilize the cart when said base member is pivoted about said axle to engage said stabilizing member with ground.

* * * * *